United States Patent [19]

Hibyan

[11] Patent Number: 4,859,148

[45] Date of Patent: Aug. 22, 1989

[54] PRELOADED TUNABLE ELASTOMERIC FLAPPING HINGE BEARING AND METHOD OF PRELOADING

[75] Inventor: Edward S. Hibyan, Trumbull, Conn.

[73] Assignee: United Technologies Corporation, Hartford, Conn.

[21] Appl. No.: 161,562

[22] Filed: Feb. 26, 1988

[51] Int. Cl.$^4$ ............ B64C 11/12; F01B 5/26; F16C 27/06

[52] U.S. Cl. ............ 416/134 A; 267/140.2; 267/140.4; 267/294; 384/221; 384/271; 384/563; 416/140

[58] Field of Search ............ 267/140.4, 140.2, 141.1, 267/294, 140.3, 293; 384/221, 222, 276, 280, 271, 272, 563, 517, 542, 538; 403/221, 225, 227, 228; 244/17.27; 416/134 A, 148, 140; 464/89, 90; 248/575, 576, 635

[56] References Cited

U.S. PATENT DOCUMENTS

| | | | |
|---|---|---|---|
| 2,327,035 | 8/1943 | Gray et al. | 384/222 |
| 2,340,503 | 2/1944 | Barenyi | 384/222 |
| 2,608,751 | 9/1952 | Hutton | 384/222 X |
| 3,984,152 | 10/1976 | Haines | 384/280 |
| 4,173,376 | 11/1979 | Standing et al. | 384/517 |
| 4,349,184 | 9/1982 | Peterson et al. | 267/140.4 X |
| 4,395,143 | 7/1983 | Bakken et al. | 384/221 |

FOREIGN PATENT DOCUMENTS

| | | | |
|---|---|---|---|
| 0015114 | of 1929 | Australia | 403/225 |
| 0586217 | 10/1933 | Fed. Rep. of Germany | 384/272 |
| 0982035 | 1/1951 | France | 403/227 |

Primary Examiner—Robert J. Oberleitner
Attorney, Agent, or Firm—Russell M. Lipes, Jr.

[57] ABSTRACT

A tail rotor flapping hinge elastomeric bearing in which the inner and outer races are split and the races have ramped surfaces with the higher slope of the inner races being toward the outer edge of the bearing. The races have a plurality of slope angles and each inner race having a groove therein to facilitate a method of preloading.

8 Claims, 4 Drawing Sheets

PRELOADED TUNABLE ELASTOMERIC FLAPPING HINGE BEARING AND METHOD OF PRELOADING

TECHNICAL FIELD

This invention relates to rotor blade bearings for helicopters and more particularly to tail rotor flapping hinge bearings.

BACKGROUND ART

In single rotor helicopters utilizing fully articulated rotor blades there are three degrees of articulation. This permits the blades to change pitch, flap and hunt. Basically, pitch change is the only action controlled directly by the pilot, being controlled through cyclic and collective pitch sticks. Pitch change is accomplished by rotating the blade sleeve about a spindle and an associated thrust bearing assembly. A change in cyclic pitch causes the blades to flap which factor requires the use of flapping hinges. A flapping hinge in a tail rotor application normally is subjected to about ±4° of blade flap and does not have the range of rotational movement such as that to which the pitch bearing is subjected.

The flapping hinge bearing, particularly as applied to a stiff in-plane tail rotor with no lag hinge, must provide a specific stiffness, especially in the edgewise plane. Further, it is important that blade edgewise and flatwise frequencies be separated. Coalescence of edgewise/flatwise frequencies must be avoided or extremely high stresses would result, leading to structural failure of the rotor assembly. Frequency tuning by spring rate adjustment of the flapping hinge bearing through the bearing structure of this invention can provide reduction of aerodynamic loading to lower blade stresses and minimize the up weight and flight weight. Also, the bearing geometry will afford the lowest possible blade weight and best frequency situation.

In certain helicopter articular rotor head models needle bearings typically have been used as the tail rotor flap bearing. However, due to current incorporation of composite blades with higher thrust requirements, bearing life has not been as long as desirable and more frequent replacement of the bearing has been required. Metal rolling element cylindrical or conical bearings require a lubrication system involving seals to contain the lubricant. Further, bearings of that type function best with large angular excursion, i.e., complete revolutions of the needle bearing. Conversely, they function poorly with small angular motion such as the flapping motion of an articulated rotor blade. The reason for this is the line contact and resultant high Hertz stress due to rollers merely rocking in place. This results in "fretting corrosion" which, as it progresses, causes the bearings to lose preload and eventually to wobble.

Replacement of metal rolling element bearings with radial elastomeric bearings has overcome the problems with metal bearings primarily because small amplitude flapping angles are ideal for the elastomeric type bearing. Replacement of the metal needle bearing with an elastomeric bearing results in dramatically extended bearing life, improves edgewise stiffness, requires no seals, and minimizes maintenance.

A frusto-conical bearing construction of concave conical form having bonded thin solid film lubricant coatings on multiple laminar surfaces with provision for axial adjustment of the inner race is described in Haines U.S. Pat. No. 3,984,152. An elastomeric bearing of convex conical form for helicopter rotors, having provision for exerting pressure on the assembly is described in Boppes et al U.S. Pat. No. 4,395,143.

DISCLOSURE OF INVENTION

An object of the present invention is to provide an improved elastomeric bearing structure for the flapping hinge of an helicopter articulated rotor head.

Another object of the invention is the provision of a flapping hinge elastomeric bearing which provides optimized edgewise moment carrying stiffness and maximized axial stiffness.

Still another object of the invention is the provision of a flapping hinge elastomeric conical bearing in which root stiffness is controlled by choosing the proper angular relationship of the frusto-conical bearing elements.

The foregoing and other objects and advantages of the invention may be seen by referring to the following description and claims, read in conjunction with the accompanying drawings.

BEST MODE FOR CARRYING OUT THE INVENTION

Figure 1:
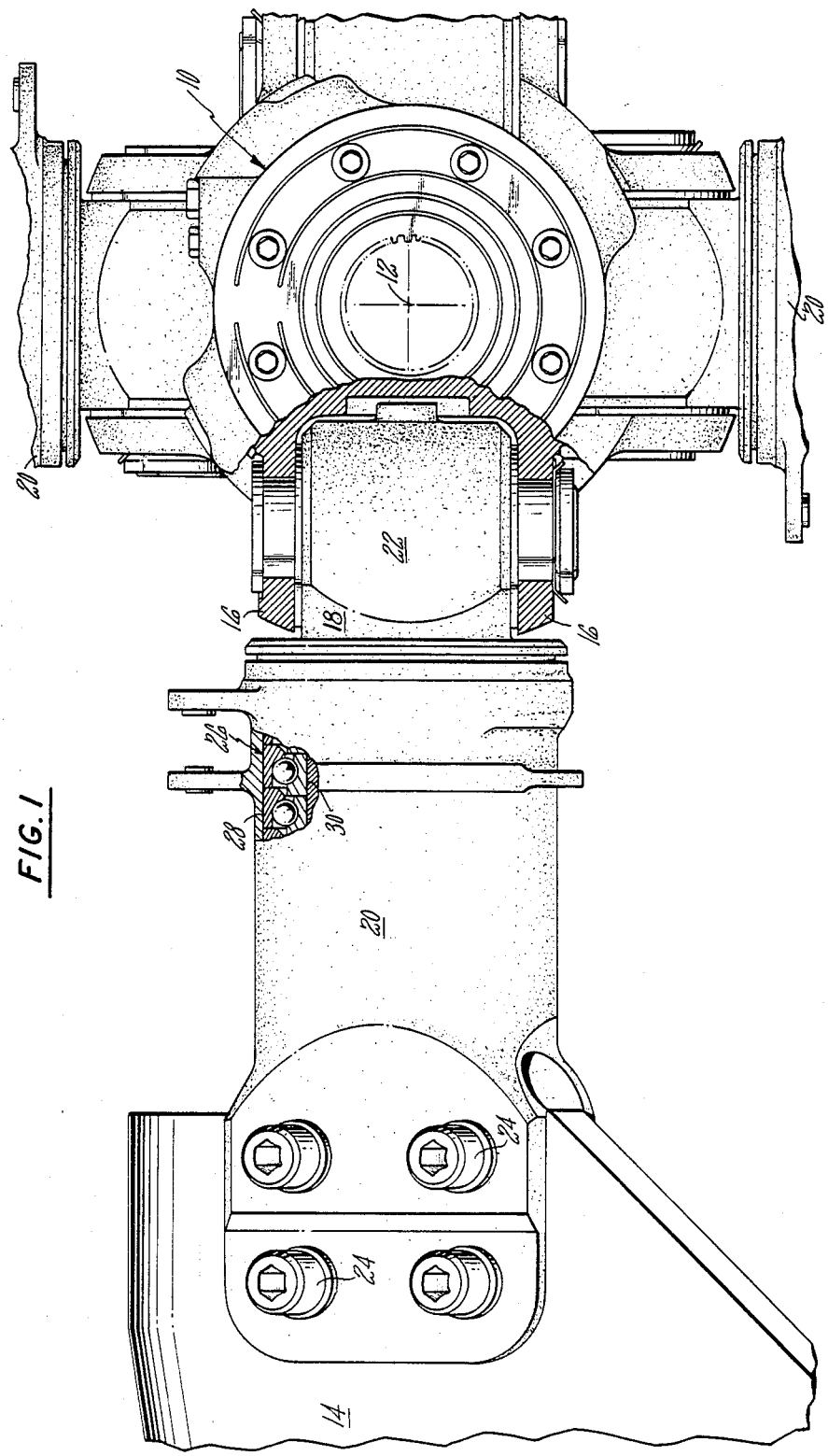
FIG. 1 is a view of a portion of an articulated rotor head including the flapping hinge and the pitch bearing.

In FIG. 1, hub 10 of a tail rotor head is shown. The hub rotates about axis 12 and has blade 14 attached thereto at lugs 16 for rotation therewith. The intermediate connection between the hub and the blade includes spindle 18 and sleeve 20, the spindle being connected directly to the hub at flapping hinge bearing 22 and the sleeve being connected to the blade by bolts 24. The connection between the spindle and the sleeve constitute pitch bearing 26, the outer race of which is defined by cylindrical wall 28 of the sleeve and the inner race of which is defined by cylindrical wall 30 of the spindle. The pitch bearing permits rotation of blade 14 about its longitudinal axis and reacts centrifugal loads on the connection.

Figure 2:
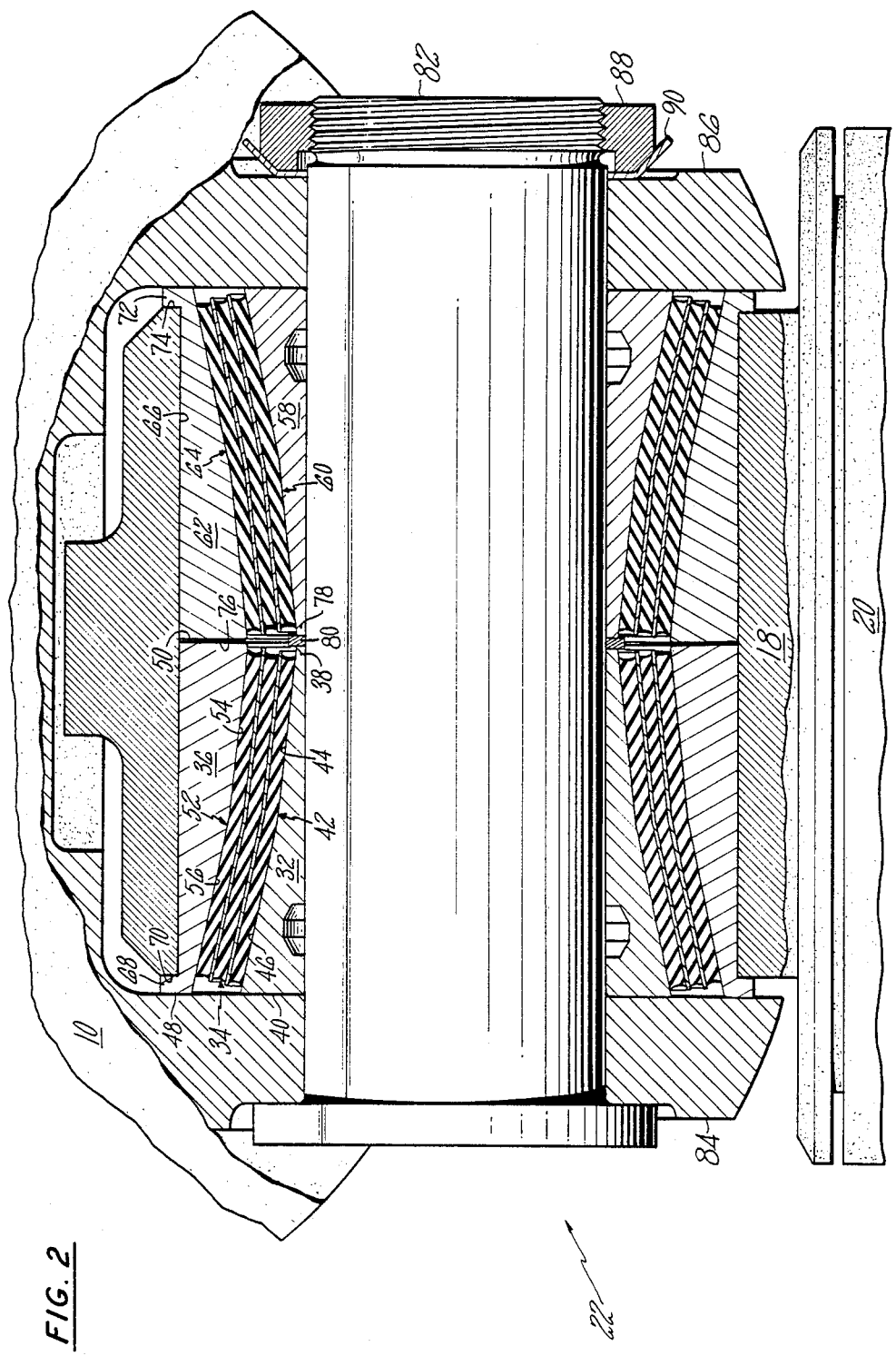
FIG. 2 is a section view of an elastomeric conical flapping hinge bearing in accordance with this invention.

Flapping hinge bearing 22 is shown in detail in FIG. 2. The bearing essentially is comprised of two half sections, each section having a unitized inner and outer race with an elastomeric structure therebetween and bonded thereto. The inner races have an outer surface which is canted with the slopes facing each other, and the outer races have an inner surface which is canted in the opposite direction with the slopes facing away from each other and, thus, essentially parallel to the opposite inner race.

As shown, the left half of the bearing includes inner race 32, elastomeric structure 34 and outer race 36. The inner race increases in thickness from its inner end face 38 to outer end face 40 and the ramped peripheral surface 42 has a plurality of slope angles including a first surface 44 having a first slope angle and second surface 46 having a greater slope angle than that of the first surface. Outer race 36 increases in thickness from its outer end 48 to inner end face 50 and the ramped interior surface 52 has a first surface 54, opposite inner race first surface 44 and having a slope angle essentially parallel to that of surface 44. The race has a second surface 56 opposite inner race second surface 46 and having a slope angle essentially parallel to that of surface 46.

The right half of the bearing has inner race 58 with periphery surface 60 and outer race 62 with interior surface 64 which surfaces are dual-sloped, the slopes being equal to but opposite in value to their counterpart surfaces in the left half of the bearing.

The flapping hinge bearing is shown in FIG. 2 as installed in spindle 18. The left and right sections of the bearing have been pressed into hole 66 thus precluding relative motion within the spindle with flange 68 of the left bearing section abutting spindle shoulder 70 and flange 72 of the right bearing section abutting spindle shoulder 74. In the installed position there may be a small gap between inner end face 50 of outer race 36 and inner end face 76 of outer race 62. There also is a small gap between inner end face 38 of inner race 32 and inner end face 78 of inner race 58. This gap is filled by spacing shim 80 of split construction. Flanges 68 and 72 have an antifriction material affixed to protect hub lugs 84 and 86.

The spindle assembly is attached to hub 10 by hinge pin 82 which passes through hub lugs 84 and 86 and inner races 32 and 58. The pin is secured in position by nut 88 and lock washer 90.

Figure 3:
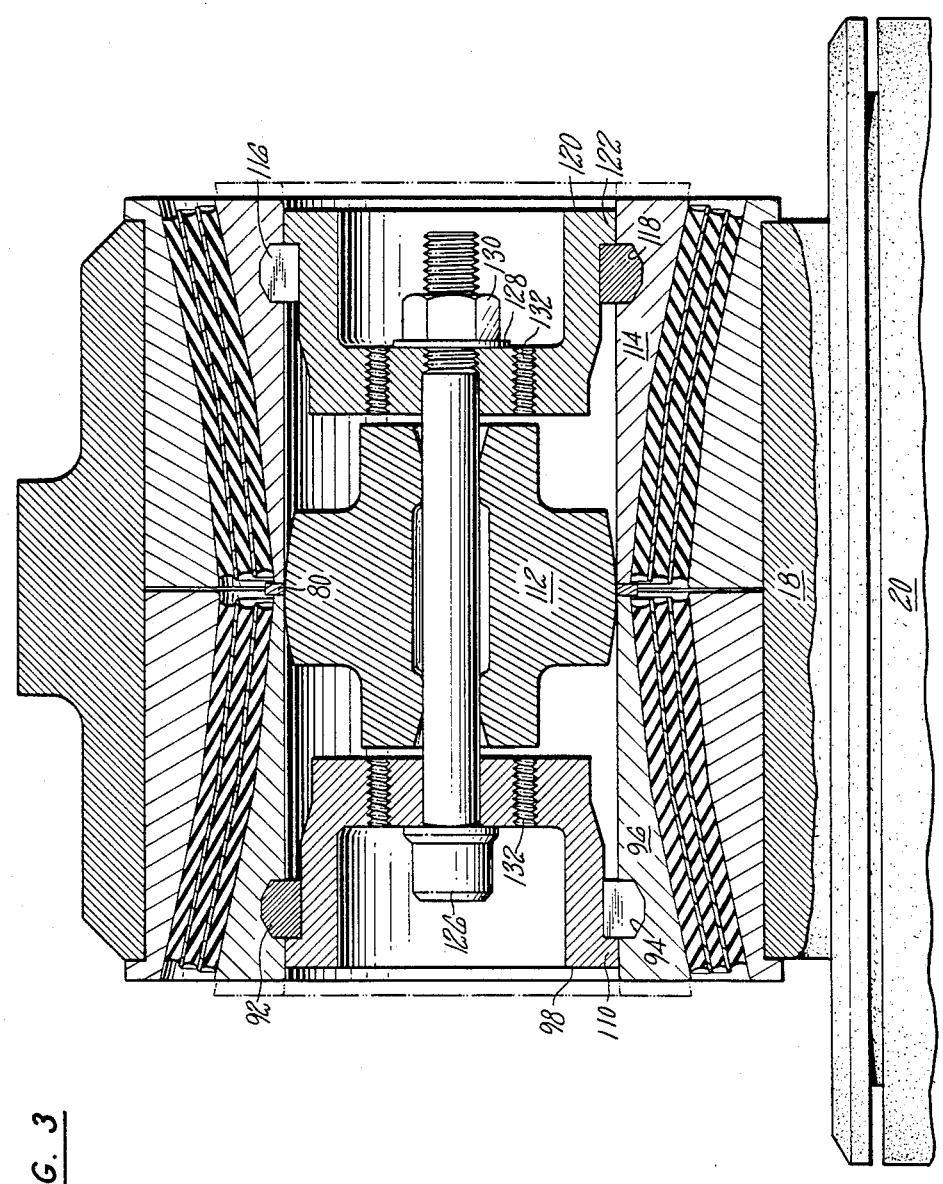
FIG. 3 is a section view of a bearing with preloading elements in position.

Preloading of the flapping hinge bearing occurs before the spindle assembly is attached to the hub. The elements of this procedure are shown in FIG. 3. In its initial form as a unitized structure, the inner races of each bearing half are positioned so that their outer ends extend outward beyond their final position, and the adjacent inner ends are spaced apart. The bearing then is preloaded by squeezing the inner races toward each other to a predetermined position, and thus a predetermined load. The final position of the inner races is a function of the thickness of the split spacing shim, such as 80 in FIG. 2, used between them. As shown in FIG. 3, retaining ring 92 having multiple circumferential segments is placed in position in groove 94 within inner race 96. A material such as LOCTITE is used to hold the segments in place. Plug 98 then is slid into position within the bearing with plug shoulder 110 seating against the ring segments. Spacer plug 112 is next inserted within the inner races. The spacer plug controls alignment of inner races 96 and 114 and also holds the split spacing shim in position prior to installation of the hinge pin. The segments of retaining ring 116 are then placed in position in groove 118 within inner race 114 and plug 120 is slid into position with plug shoulder 122 seating against the ring segments.

With the two plugs 98 and 120 and spacer plug 112 in position, bolt 126 is inserted through them and washer 128 and nut 130 applied. The bolt and nut are then torqued to cause the two inner races to move toward each other and compress the elastomeric material with the higher preload being imposed at the steeper outer portions of the elastomer because of the dual opposite facing slopes of the inner and outer races. The inner races are forced inward to a predetermined position in accordance with the thickness of split shim 80. Threaded holes 132 are provided in the face of each plug to permit the use of a tool for withdrawal of the plugs.

When the inner races of the bearing have been compressed to the desired dimension and loading, the sleeve and spindle assembly are then placed in position between hub lugs 84 and 86, FIG. 2. A clamping fixture is then applied to the hub lugs to prevent them from spreading when the preload on the inner races is released. The preload elements such as nut 130, washer 128, bolt 126, plugs 98, 112 and 120, and retaining rings 92 and 116 as shown in FIG. 3 are then removed and hinge pin 82, nut 88 and washer 90 are installed. The clamping fixture is removed, of course, after the bearing installation.

If additional stiffness, that is a higher bearing preload, is required due to frequency sensitivity or permanent set of the elastomer, split shim 80 can be removed and discarded. This will permit axial adjustment of the two inner races toward each other. When this is done, shims equal in thickness to the thickness of shim 80 would be placed between the outer end face of each inner race and the adjacent hub lug before reinstallation of the hinge pin.

Figure 4:
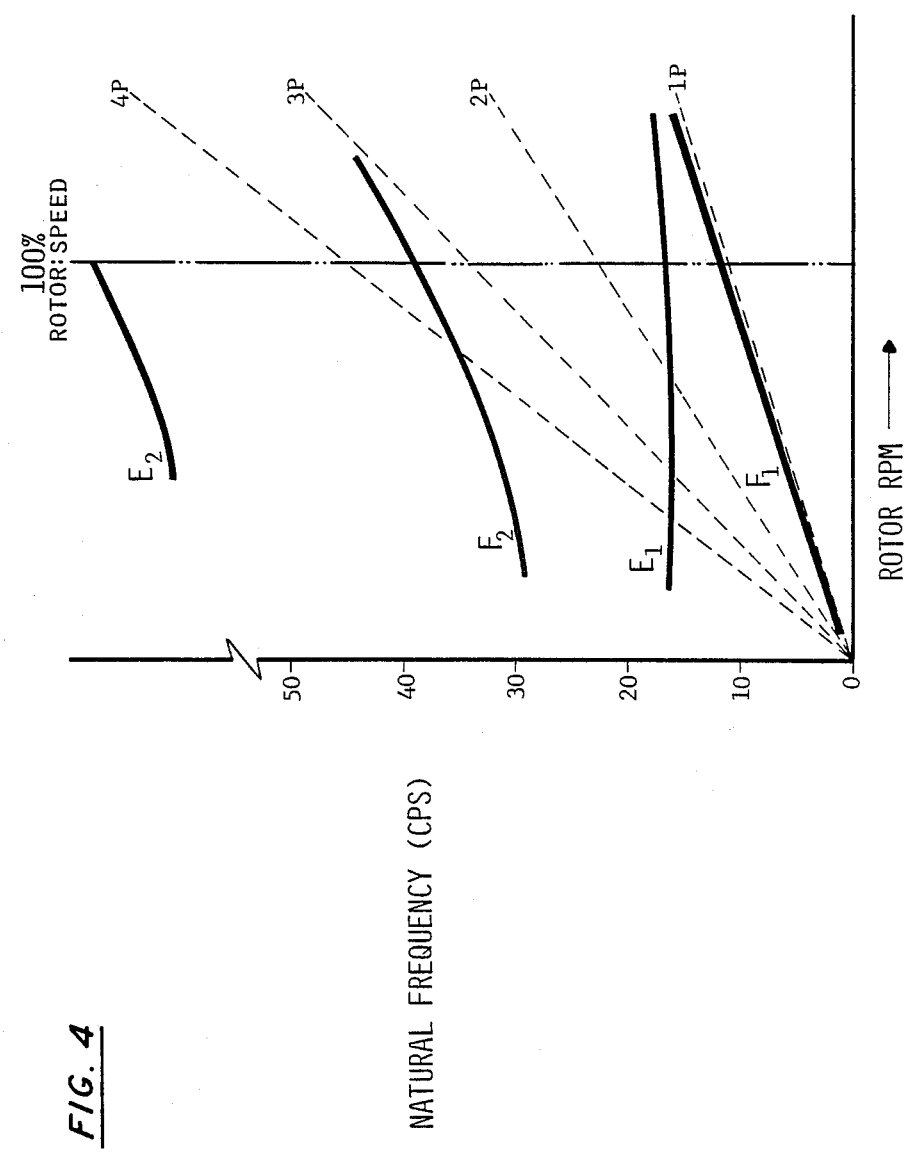
FIG. 4 is a plot of rotor frequency intercepts.

FIG. 4 is a plot showing the relationship of aerodynamic forced frequency to natural frequency and the separation of edgewise and flatwise frequencies in a rotor employing the flapping bearing configuration of this invention. In the plot, critical frequencies 1P, 2P, 3P and 4P are shown as broken lines. At normal operating rotor RPM (100%), the blade system edgewise natural frequencies must not be in close proximity to these critical frequencies. This requirement assures avoidance of unacceptably high blade stresses. The blade assembly and root end attachment have a combined stiffness resulting in flatwise frequency lines F1, F2, and edgewise frequency lines E1, E2.

The first flatwise frequency line F1, essentially parallels the 1P line, and it would intersect the first edgewise line E1, to the right beyond the 100% rotor RPM line. Thus, there is separation of the flatwise and edgewise frequencies at the 100% rotor operating point. Similarly, the second order flatwise and edgewise frequency lines, F2 and E2, show even wider separation at the 100% rotor RPM line. The flapping hinge offset, that is the distance between the axis of the flapping hinge and the axis of rotation of the rotor, controls the position of the F1 curve. In the preferred design, E1 is generally equidistant between 1P and 2P at the 100% rotor speed line. This frequency placement results in minimum blade loads, minimum stresses and minimum blade and hub assembly weight. If E1 is in close proximity of either 1P or 2P, blade stresses increase dramatically. Higher harmonics must adhere to the same rules to avoid high blade stresses.

The tunable elastomeric flap bearing structure of this invention provides a preload means to adjust the root end spring rate to a desired value and frequencies described above. Tuning the spring rate by means of axial displacement of the bearing races results in the elastomer preload (compression) required for proper placement of the first edgewise frequency line E1 between the critical frequencies 1P and 2P. Also, F2 is suitably separated from 3P and 4P.

Rotor stiffness is controlled by choosing the angular relationship of the stepped surfaces of the frusto-conical elastomeric bearing elements. For optimum stiffness, the cone angles of the bearing inner race surfaces will increase as the distance from the bearing centerline increases. The steeper angle of the elastomeric segments result in more compression for the same linear preload motion of the inner race when compared to compression of the less steep elastomeric segments. The use of the stepped configuration results in maximized stiffness perpendicular to the inner race and maximum axial/thrust load carrying capacity of the bearing.

It should be understood that the invention is not limited to the particular embodiment shown and described herein, but that various changes and modifications may be made without departing from the spirit or scope of this concept as defined by the following claims.

I claim:

1. An elastomeric bearing for the flapping hinge of a helicopter articulated rotor head, said bearing having an inner race and an outer race with elastomeric means between said races, said inner and said outer races consisting of two elements, each element having an inner face in close proximity to the inner face of said other element and located near the middle of the bearing, and each element having an outer face located adjacent the outer edge of said bearing, each inner race element having an inner periphery toward said inner face having a first slope angle and an outer periphery toward said outer face having a slope angle greater than the slope angle of said inner periphery, and said outer race having an inner periphery with surfaces opposite and essentially parallel to those of its opposite inner race element.

2. An elastomeric bearing in accordance with claim 1 in which said inner races have means by which said races may be moved to establish a predetermined loading on said bearing.

3. A method of preloading an elastomeric bearing for the flapping hinge of a helicopter articulated rotor head in which the hinge is located between a rotor hub and blade spindle and in which the bearing consists of a pair of inner and a pair of outer races with elastomeric material between said races and sloped surfaces on said inner races facing toward each other and sloped surfaces on said outer races facing away from each other and being essentially parallel to the opposite inner race surface, the method comprising the steps of pressing each pair of inner and outer races from opposite directions into a hole in said blade spindle, inserting retaining ring means in grooves in each inner race and positioning in place, installing plug means in each inner race, said plug means being guided by and having a shoulder abutting said retaining ring means, inserting bolting means through said plug means, rotating said bolting means to cause said inner races to move toward each other to a predetermined bearing preloading position, installing said bearing and said spindle in position between lugs on said rotor hub, removing said bolting means from said plug means, and then removing said plug means and retaining ring means, installing hinge pin means through said lugs and said inner races of said bearing, and rotating said hinge pin means to a predetermined loading.

4. A method of preloading an elastomeric bearing for the flapping hinge of a helicopter articulated rotor head in which the hinge is located between a rotor hub and blade spindle and in which the bearing consists of a pair of inner and a pair of outer races with elastomeric material between said races and each race has a sloped surface with a plurality of slope angles with the surface of each inner race having the higher slope angle being located toward the outer edge of the bearing, the method comprising the steps of pressing each pair of inner and outer races from opposite directions into a hole in said blade spindle, inserting retaining ring means in grooves in each inner race and positioning in place, installing plug means in each inner race, said plug means being guided by and having a shoulder abutting said retaining ring means, inserting bolting means through said plug means, rotating said bolting means to cause said inner races to move toward each other to a predetermined bearing preloaded position, installing said bearing and said spindle in position between lugs on said rotor hub, removing said bolting means from said plug means, and then removing said plug means and retaining ring means, installing hinge pin means through said lugs and said inner races of said bearing, and rotating said hinge pin means to a predetermined loading.

5. A method of preloading an elastomeric bearing for the flapping hinge of a helicopter articulated rotor head in which the hinge is located between a rotor hub and blade spindle and in which the bearing consists of a pair of inner and a pair of outer races with elastomeric material between said races and each race has a sloped surface with a plurality of slope angles with the surface of each inner race having the higher slope angle being located toward the outer edge of the bearing, the method comprising the steps of pressing each pair of inner and outer races from opposite directions into a hole in said blade spindle, inserting retaining ring means in grooves in each inner race and positioning in place, installing plug means in each inner race, said plug means being guided by and having a shoulder abutting said retaining ring means, inserting bolting means through said plug means, rotating said bolting means to cause said inner races to move toward each other to a predetermined bearing preloading position, installing said bearing and said spindle in position between lugs on said rotor hub, positioning clamping means to prevent said hub lugs from spreading, removing said bolting means from said plug means, and then removing said plug means and retaining ring means, installing hinge pin means through said lugs and said inner races of said bearing, rotating said hinge pin means to a predetermined loading, and removing said clamping means from said hub lugs.

6. An elastomeric bearing assembly for the flapping hinge of a helicopter articulated rotor head in which the bearing assembly includes a pair of inner and a pair of outer races with elastomeric means between each pair of inner and outer races, the surfaces of said races adjacent said elastomeric means being sloped with the surfaces of said inner races facing inwardly of the bearing toward each other and the surfaces of said outer races being essentially parallel thereto, means for establishing a preload on the bearing including a groove around the inner circumference of each inner race for the temporary positioning of a retaining ring, plug means to be temporarily installed within each inner race and restrained against inner movement by said retaining rings, spacer means to be temporarily installed within said inner races and between said plug means to control alignment of said inner races, and means to be temporarily installed through said plug means for moving the plugs and inner races toward each other to a predetermined preload position.

7. An elastomeric bearing assembly in accordance with claim 6 in which the races are double sloped.

8. An elastomeric bearing assembly in accordance with claim 6 having an annular shim installed between said inner races to establish the preload position of said inner races.

* * * * *